US010041300B2

(12) United States Patent
Maghrabi et al.

(10) Patent No.: US 10,041,300 B2
(45) Date of Patent: Aug. 7, 2018

(54) ORGANO-CLAY FREE INVERT EMULSION FLUIDS

(71) Applicant: HALLIBURTON ENERGY SERVICES, INC., Houston, TX (US)

(72) Inventors: Shadaab Syed Maghrabi, Thane (IN); Vikrant Bhavanishankar Wagle, Mumbai (IN); Dhanashree Gajanan Kulkarni, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/311,475

(22) PCT Filed: May 15, 2014

(86) PCT No.: PCT/US2014/038029
§ 371 (c)(1),
(2) Date: Nov. 15, 2016

(87) PCT Pub. No.: WO2015/174974
PCT Pub. Date: Nov. 19, 2015

(65) Prior Publication Data
US 2017/0081580 A1    Mar. 23, 2017

(51) Int. Cl.
E21B 7/00 (2006.01)
E21B 21/00 (2006.01)
C09K 8/36 (2006.01)

(52) U.S. Cl.
CPC ............ E21B 7/00 (2013.01); C09K 8/36 (2013.01); E21B 21/00 (2013.01); C09K 2208/32 (2013.01)

(58) Field of Classification Search
None
See application file for complete search history.

(56) References Cited

U.S. PATENT DOCUMENTS 3,244,623 A * 4/1966 King .................. C09K 8/203
                                                   507/109
4,664,843 A    5/1987 Burba, III et al.
(Continued)

FOREIGN PATENT DOCUMENTS

| WO | 1998/005734 | 2/1998 |
| WO | 2014/052510 | 4/2014 |
| WO | 2015/174974 | 11/2015 |

OTHER PUBLICATIONS

PCT International Search Report and Written Opinion, dated Feb. 13, 2015, Appl No. PCT/US2014/038029, Filed May 15, 2014, " Organo-Clay Free Invert Emulsion Fluids," 14 pgs.
(Continued)

Primary Examiner — Anuradha Ahuja
(74) Attorney, Agent, or Firm — Polsinelli PC

(57) ABSTRACT

A method of drilling a subterranean formation includes providing an invert emulsion fluid comprising an oleaginous continuous phase; an internal phase comprising water; bentonite; and mixed metal layered hydroxides comprising hydroxide ions associated with at least two metal cations wherein one is divalent and another is trivalent; and drilling the subterranean formation with the drilling fluid. Invert emulsion drilling fluids include an oleaginous continuous phase; an internal phase comprising water; sodium bentonite; and mixed metal layered hydroxides comprising hydroxide ions associated with at least two metal cations.

19 Claims, 1 Drawing Sheet

(56) References Cited

U.S. PATENT DOCUMENTS

| | | | | |
|---|---|---|---|---|
| 4,990,268 | A | * | 2/1991 | Burba, III ............. C01B 13/363 252/184 |
| 5,094,778 | A | * | 3/1992 | Burba, III ............. B82Y 30/00 252/184 |
| 5,260,269 | A | * | 11/1993 | Hale ....................... C09K 8/22 507/136 |
| 5,308,547 | A | * | 5/1994 | Burba, III ............. B82Y 30/00 252/184 |
| 5,504,061 | A | | 4/1996 | Plank |
| 5,658,859 | A | | 8/1997 | Burba, III et al. |
| 5,663,122 | A | * | 9/1997 | Mueller .................. C09K 8/05 507/109 |
| 6,025,303 | A | | 2/2000 | Keilhofer et al. |
| 6,365,639 | B1 | * | 4/2002 | Hoy ..................... B01J 13/0078 252/184 |
| 6,475,959 | B1 | * | 11/2002 | Lange .................. C09K 8/032 252/184 |
| 6,914,081 | B2 | * | 7/2005 | Hoy ..................... B01J 13/0078 252/184 |
| 7,939,470 | B1 | | 5/2011 | Wagle et al. |
| 2003/0131999 | A1 | * | 7/2003 | Nguyen .................. C09K 8/68 166/280.2 |
| 2007/0227404 | A1 | * | 10/2007 | Plank ..................... C09K 8/16 106/694 |
| 2011/0214864 | A1 | | 9/2011 | Maghrabi et al. |
| 2012/0097403 | A1 | * | 4/2012 | Maghrabi ............... E21B 43/16 166/381 |

OTHER PUBLICATIONS

Arbuzov, A. A. et al., "Memory magnetic imaging defectoscopy", SPE 162054; Arbuzov, A.A., Bochkarev, V.V., Bragin, A.M., Maslennikova, Y.S., Zagidullin, B.A., Achkeev, A.A. and Kirillov, R.S./TGT Prime; Copyright 2012, Society of Petroleum Engineers, Oct. 16-18, 2012, 10 pgs.

Burba, J. L. et al., "Field Evaluations Confirm Superior Benefits of MMLHC Fluid System on Hole Cleaning, Borehole Stability, and Rate of Penetration", IADC/SPE 19956; J.L. Burba, The Dow Chemical Co.;W.F. Tehan and F,D. Hamilton,* Dallas ProductionInc.; W.E. Holman,*Westbridge Oiifield Products;C. Porzucek* and C.P. Christenson, The Dow Chemical Co.; and J. McKenzie, Westbridge Oilfield Products; copyri, 10 pgs, 1990.

Burba III, J. L. et al., "Laboratory and Field Evaluations of Novel Inorganic Drilling Fluid Additive", IADCISPE 17198; J,L. Burba III, The Dow Chemical Co.; W.E. Holman, Westbridge Oilfield Products; and C,R. Crabb, The Dow Chemical Co.; Copyright 1988, IADC/SPE Drilling Conference, 8 pgs.

Fraser, L. J. et al., "Mechanistic Investigation of the Formation Damaging Characteristics of Mixed Metal Hydroxide Drill-In Fluids and Comparison with Polymer Base Fluids", SPE 30501; L.J. Fraser, SPE, Schlumberger Dowell, P. Reid, SPE, Schlumberger Cambridge Research, D. Williamson, SPE, and F. Enriquez, Jr., Schlumberger Dowell; Copyright 1995. Society of Petroleum Engineers, Inc., 11 pgs.

Schaneman, Boyd D. et al., AADE-03-NTCE-41; Boyd D. Schaneman, ChevronTexaco, Tom Jones, and Anthony B. Rea, M-I L.L.C.; Copyright 2003 AADE Technical Conference, 7 pgs.

* cited by examiner

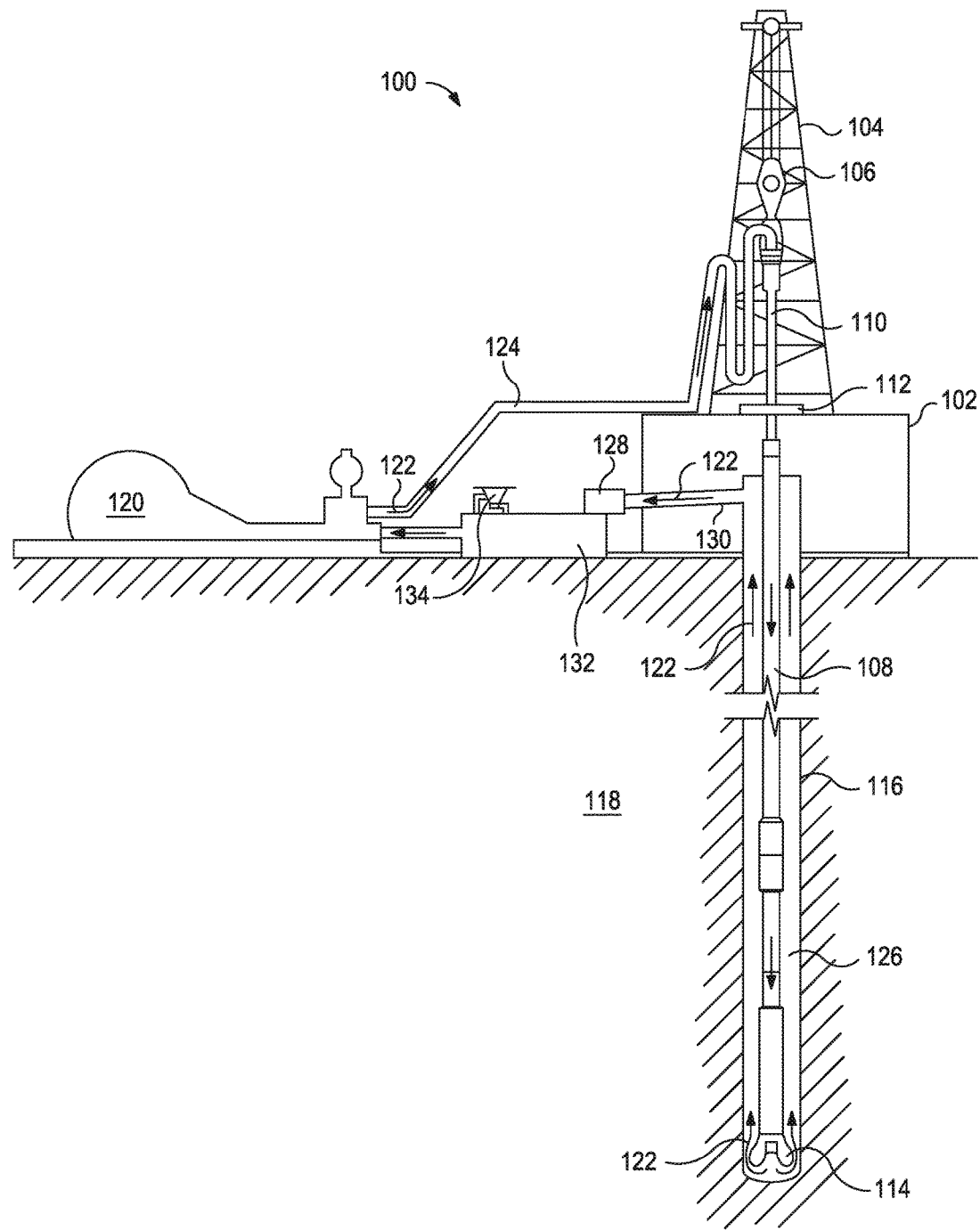

ORGANO-CLAY FREE INVERT EMULSION FLUIDS

BACKGROUND

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic fluid-based muds are normally used to drill swelling or sloughing shales, salt, gypsum, anhydrite or other evaporate formations, hydrogen sulfide-containing formations, and hot (greater than about 300° F.) holes, but may be used in other holes penetrating a subterranean formation as well. Unless indicated otherwise, the terms "oil mud" or "oil-based mud or drilling fluid" shall be understood to include synthetic oils or other synthetic fluids as well as natural or traditional oils, and such oils shall be understood to comprise invert emulsions.

Oil-based muds used in drilling typically comprise: a base oil (or synthetic fluid) comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. Such additives commonly include organophilic clays and organophilic lignites. An oil-based or invert emulsion-based drilling fluid may commonly comprise between about 50:50 to about 95:5 by volume oil or oleaginous phase to water or aqueous phase.

"Clay-free" invert emulsion-based drilling fluids offer different properties over drilling fluids containing organophilic clays. As used herein, the term "clay-free" (or "clay-less") means a drilling fluid made without addition of any organophilic clays or lignites to the drilling fluid composition.

In conventional invert emulsion drilling fluids, and in some "clay-free" invert-emulsion drilling fluids, brine rather than pure water is used for the internal phase because the salts such as calcium chloride in the brine enable balancing of osmotic pressures during drilling through shales. That is, the salt helps keep the water activity of the drilling fluid the same as the water activity of the shale, thereby preventing the flow of water from the drilling fluid into the shales and thus avoiding swelling of the shales. The concentration of salt used in the internal phase depends on the activity of water present in the shales.

Use of high concentrations of chloride salts can give rise to disposal issues and environmental concerns and can also result in high conductivity which interferes with the sensitivity of induction logs during exploratory drilling. Alternative electrolytes, such as potassium acetate or formate, have been used, but these salts are often cost prohibitive and still limit induction log sensitivity. Other substitutes such as potassium chloride, sodium chloride and magnesium sulfate result in similar disposal issues.

Alcohols, particularly glycerols, polyglycerols, and cyclicetherpolyols have also been tried as an alternative to calcium chloride brines for the internal phase of conventional invert emulsion drilling fluids. An advantage of using alcohols in the internal phase is that much of the concern for the ionic character of the internal phase is no longer required. When water is not present in the system, hydration of the shales is greatly reduced. Alcohols can still interact with the clays of the shales but swelling is considered still significantly less than with water. Conventionally, the problem with using alcohols as an internal phase of an invert emulsion is that the invert emulsions tend to be less stable at the high temperatures commonly encountered in subterranean formations during drilling for hydrocarbons. This instability is believed to be due to the alcohols tending to separate or become insoluble at elevated temperatures. Even when more heat tolerant alcohols are employed, barite settling and an undesirably high filtrate rate indicating invert emulsion instability at high temperatures and high pressures have been observed.

Clay-free invert emulsion fluids formulated without the organophilic clay provide gels which are high but yet break easily on application of lower pump pressures than usual. Clay-free invert emulsion drilling fluids, like INNOVERT™ drilling fluid available from Halliburton Energy Services, Inc., in Houston, Tex., for example, have been shown to yield high performance drilling, with "fragile gel" strengths and rheology leading to lower equivalent circulating density (ECDs) and improved rate of penetration (ROP). ECD is the effective density exerted by a circulating fluid against the formation, and accounts for the pressure drop in the annulus above the point being considered. Due to easy conversion from a gel to liquid phase, the equivalent circulating density spikes usually observed are lower or absent when breaking circulation, tripping in & out and during connections. The lower or absent ECD spikes reduces the probability of induced fractures which translates into lower fluid losses into the formation, where fluid is lost (e.g., leaking off) into other portions or fractures in the formation besides the dominant fracture. High gel strength observed in clay free invert emulsion fluids provides enough suspension to prevent any barite from settling reducing incidents of a density gradient and worst case scenario which is SAG, the settling of particles in the annulus of a well, that can lead to a well control situation. The high gels and also aids in hole cleaning by suspending the drill solids and preventing them from falling back to the bottom and interfering with the function of the bit. One more advantage realized without the addition of the organophilic clay is the absence of thick progressive gels that are observed after long static periods. A thick gel can require enormous pump pressures before the gel transition to a liquid and flow. A high pump pressure implies a high ECD which is experienced at the bottom leading to induced fractures and therefore losses.

An essential criterion for assessing the utility of a fluid as a drilling fluid or as a well service fluid may include the fluid's rheological parameters, particularly under simulated drilling and well bore conditions. For use as a drilling fluid, or as a fluid for servicing a well, a fluid generally should be capable of maintaining certain viscosities suitable for drilling and circulation in the well bore. Preferably, a drilling fluid will be sufficiently viscous to be capable of supporting and carrying the well drill cuttings to the surface without being so viscous as to interfere with the drilling operation. Moreover, a drilling fluid must be sufficiently viscous to be able to suspend barite and other weighting agents. However, increased viscosity can result in problematic sticking of the drill string, and increased circulating pressures can contribute to lost circulation problems.

It was observed that clay free invert emulsion fluids formulated at low to medium density (8.5-12 ppg) without the addition can experience lower than the desired rheology which is required for the drilling fluid to perform its hole functions. Thus, a need exists for a clay-free invert emulsion fluid with improved rheological and stability characteristics.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

FIG. 1 shows an illustrative example of an apparatus useful for drilling a wellbore with the invert emulsion compositions of the invention.

DETAILED DESCRIPTION

The present invention generally relates to the use of invert emulsion fluids in subterranean operations, and, more specifically, to clay-free invert emulsions fluids and methods of using these fluids in various subterranean operations.

In one embodiment of the invention, a method of drilling a subterranean formation includes providing or using an invert emulsion drilling fluid including an oleaginous continuous phase, a nonoleaginous discontinuous phase, mixed metal hydroxides comprising hydroxide ions associated with at least two metal cations, and bentonite, wherein the drilling fluid is substantially free of organophilic clays, and drilling the subterranean formation with the drilling fluid. In an embodiment, the oleaginous continuous phase of the drilling fluid comprises at least one base oil selected from the group of oils consisting of synthetic oils comprising an ester or olefin; diesel oils; mineral oils selected from the group consisting of n-paraffins, isoparaffins, cyclic alkanes, branched alkanes, and mixtures thereof. In another embodiment, the mixed metal layered hydroxides comprise at least two metal cations, wherein one is a divalent cation selected from the group consisting of Mg Ca, Ba, Sr, Mn, Fe, Co, Ni, Cu and Zn, and another is a trivalent cation selected from the group consisting of Al, Ga, Cr and Fe. In a preferred embodiment, the mixed metal layered hydroxides comprise aluminum and magnesium. In some embodiments, the bentonite is an externally added sodium bentonite from the formation. In further embodiments, a portion of the bentonite in the drilling fluid is externally sourced from the formation.

An exemplary embodiment of the invention is directed to an invert emulsion drilling fluid comprising: an oleaginous continuous phase; an internal phase comprising water; bentonite; and mixed metal layered hydroxides comprising hydroxide ions associated with at least two metal cations one of them a divalent cation and another a trivalent cation. In an embodiment, the oleaginous continuous phase of the drilling fluid comprises at least one base oil selected from the group of oils consisting of synthetic oils comprising an ester or olefin; diesel oils; mineral oils selected from the group consisting of n-paraffins, isoparaffins, cyclic alkanes, branched alkanes, and mixtures thereof. In another embodiment, the mixed metal hydroxides comprise at least two metal cations wherein one of them is a divalent cation from the group Mg Ca, Ba, Sr, Mn, Fe, Co, Ni, Cu and Zn, and the other is a trivalent cation from the group Al, Ga, Cr and Fe. In a preferred embodiment, the mixed metal layered hydroxides comprise aluminum and magnesium.

As used herein, the term "drilling" or "drilling wellbores" shall be understood in the broader sense of drilling operations, which includes running casing and cementing as well as drilling, unless specifically indicated otherwise. The method of the invention comprises using the drilling fluid of the invention in drilling wellbores. During drilling, the drilling fluid is not dependent on organophilic clays (also called "organo-clays") to obtain suspension of drill cuttings or other solids at rest, and lacks a significant (if any) pressure spike upon resumption of drilling.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase. As used herein, the term "emulsion" means a colloid in which an aqueous liquid is the continuous (or external) phase and a hydrocarbon liquid is the dispersed (or internal) phase. As used herein, the term "invert emulsion" means a colloid in which a hydrocarbon liquid is the external phase and an aqueous liquid is the internal phase. There can be more than one internal phase of the emulsion or invert emulsion, but only one external phase. For example, there can be an external phase which is adjacent to a first internal phase, and the first internal phase can be adjacent to a second internal phase. Any of the phases of an emulsion or invert emulsion can contain dissolved materials and/or undissolved solids.

In embodiments where the drilling fluid is free of organophilic clay, the drilling fluid of the invention provides the advantages of an organophilic clay-free system as well as high pressure and high temperature stability. While some organophilic clay may enter the fluid in the field, for example due to mixing of recycled fluids with the fluid of the invention, the fluid of the invention is tolerant of such clay in insubstantial quantities, that is in quantities less than about 3 pounds per barrel.

Base Oils

In some embodiments of the invention, the base oil of the invert emulsion drilling fluid may include at least one of synthetic oils comprising an ester or olefin; diesel oils; mineral oils selected from the group consisting of n-paraffins, isoparaffins, cyclic alkanes, branched alkanes, and mixtures thereof.

Internal Phase

An internal phase fluid, also known as a nonoleaginous discontinuous phase, in the inverse emulsion fluids of the invention may include an aqueous solution containing a water activity lowering compound, composition or material. Such solutions are preferably a saline solution comprising calcium chloride (typically about 25% to about 30%, depending on the subterranean formation water salinity or activity), although other salts or water activity lowering materials such as for example glycerol or sugar known in the art may alternatively or additionally be used. Such other salts may include for example sodium chloride, sodium bromide, calcium bromide and formate salts. Water preferably comprises less than 50%, or as much as about 50%, of the drilling fluid and the oil:water ratio preferably ranges from about 50:50 to about 95:5.

Mixed Metal Layered Hydroxides

In some embodiments of the invention, the mixed metal layered hydroxides are inorganic materials containing hydroxide ions associated with two or more metal cations, where one is a divalent cation and another is a trivalent cation and carry a positive charge. In certain embodiments, aluminum, magnesium and hydroxide ions are present in the crystal layers, but due to symmetry considerations, sufficient hydroxide ions are not available to electrically offset the charges of the two cations. Thus, a net positive charge exists on the crystal surfaces due to an excess of aluminium cations. When used in water-based drilling fluids, mixed metal hydroxides show high temperature stability and are characterized by unique gel structures for carrying and suspending drill cuttings. When mixed metal layered hydroxides interact with sodium bentonite, the resulting fluid may possess high shear thinning and may also aid in preventing the damage of internal filter cakes.

In the present invention, mixed metal hydroxide and bentonite interactions provide enhanced rheology and suspension characteristics in the absence of externally added low gravity solids for clay-free invert emulsion drilling fluids.

Mixed metal hydroxides useful in the invention are commercially available from Halliburton Energy Services, Inc., Houston, Tex. designated with the trade name N VIS HI PLUS™. In some embodiments, the mixed metal layered hydroxides comprise at least two metal cations, wherein one of them is a divalent cation from the group Mg Ca, Ba, Sr, Mn, Fe, Co, Ni, Cu and Zn, and another is a trivalent cation from the group Al, Ga, Cr and Fe. In a preferred embodiment, aluminum and magnesium are selected for the mixed metal layered hydroxides.

In an embodiment, the mixed metal hydroxides are present in the amount of about 2 ppb to about 20 ppb.

Bentonite

The present invention includes using bentonite along with the mixed metal hydroxides mentioned above. Bentonite is an aluminum phyllosilicate whose composition can vary in its dominant elements. When first mined or extracted, for example, sodium bentonite mined from Wyoming, often has a moisture content that is approximately about 30% to about 35% by weight. In many instances, this moisture may be removed to be about 6% to about 15% by weight. This is considered by the industry to be "dry" bentonite despite the significant moisture content. The moisture content may vary from application to application, and may be dependent on exposure to fluids in the ground that hydrates the bentonite to a higher moisture content.

The bentonite component of the invention may comprise a natural bentonite or a modified bentonite. Both granular and powdered bentonite may be suitable. Modified bentonites may be suitable. These include those modified with potassium (K), sodium (Na), calcium (Ca), and aluminum (Al). Sodium bentonite may be especially suitable in the bentonite barrier compositions of the present invention. A suitable high quality bentonite is commercially available as "NATIONAL™ Standard and/or Premium Bentonite" from Bentonite Performance Minerals LLC. An additional useful bentonite is AQUAGEL GOLD SEAL™, which is a premium, high-yielding Wyoming sodium bentonite, available from Halliburton Energy Services, Inc., Houston, Tex.

In certain embodiments, the bentonite is externally added to the drilling fluids. "Externally added," or "externally sourced" means that as a result of the drilling process itself, bentonite from the formation is incorporated into the drilling fluids. This source of bentonite is different from the bentonite that may be added to the fluids by a drilling operator. In exemplary embodiments, sodium bentonite is externally added to the drilling fluids. In further embodiments, only a portion of the bentonite that is in the drilling fluids is externally sourced from the formation.

In an embodiment, the bentonite is present in the amount of about 1 ppb to about 20 ppb. A preferred embodiment is between about 1 to about 5 ppb.

Fluid Density

In certain embodiments, the invert emulsion drilling fluids have a density which is pumpable for introduction down hole. In exemplary embodiments, the density of the invert emulsion drilling fluids is from about 8.5 pounds per gallon (ppg) to about 20 ppg.

Fluid Additives

Typical additives suitable for use in drilling fluids of the present invention include, for example: additives to reduce or control temperature rheology or to provide thinning, for example, additives having the tradenames COLDTROL™, ATC™, and OMC2™; additives for enhancing viscosity, for example, an additive having the tradename RHEMOD L™; additives for providing temporary increased viscosity for shipping (transport to the well site) and for use in sweeps, for example, an additive having the tradename TEMPERUS™ (modified fatty acid); additives for filtration control, for example, additives having the tradename ADAPTA™; emulsifier activator like lime, additives for high temperature high pressure control (HTHP) and emulsion stability, for example, additives having the tradename FACTANT™ (highly concentrated tall oil derivative), which is present in the paraffin/mineral oil-based drilling system having the tradename INNOVERT™; and additives for emulsification, for example, additives having the tradename EZ MUL NT™ (polyaminated fatty acid). All of the aforementioned trademarked products are available from Halliburton Energy Services, Inc. in Houston, Tex. One of skill in the art will realize that the exact formulations of the fluids of the invention vary with the particular requirements of the subterranean formation.

Invert emulsion drilling fluids of the present invention, comprising the mixed metal hydroxides and bentonite, maintain acceptable and even preferred rheology measurements at low mud weights and do not experience a decreased rate of penetration (and with clay-free invert emulsion drilling fluids, also do not experience a decline in desired fragile gel strength) when in use in drilling even at high temperatures and pressures. The invert emulsion drilling fluids of the present invention, comprising the mixed metal hydroxides and bentonite, may have increased LSYP, YP, and 10 minute Gel Strength but similar or lower PV relative to the drilling fluid without the mixed metal hydroxides and bentonite. These advantages of the present invention are believed to be due to the addition of the mixed metal hydroxides and bentonite to the drilling fluid. The advantages of the present invention are especially appreciated where the drilling fluid does not also contain organophilic clay or lignite.

The exemplary invert emulsion compositions disclosed herein may directly or indirectly affect one or more components or pieces of equipment associated with the preparation, delivery, recapture, recycling, reuse, and/or disposal of the disclosed drilling fluid compositions. For example, and with reference to FIG. 1, the disclosed drilling fluid compositions may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates the drilling fluids of the present invention 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed components may be added to the invert emulsion drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed components may be added to the invert emulsion drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed components may be stored, reconditioned, and/or regulated until added to the invert emulsion drilling fluid 122.

As mentioned above, the disclosed drilling compositions may directly or indirectly affect the components and equipment of the drilling assembly 100. For example, the disclosed drilling compositions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary drilling fluid compositions.

The disclosed drilling compositions may directly or indirectly affect the pump 120, which representatively includes any conduits, pipelines, trucks, tubulars, and/or pipes used to fluidically convey the drilling fluid compositions downhole, any pumps, compressors, or motors (e.g., topside or downhole) used to drive the drilling fluid compositions into motion, any valves or related joints used to regulate the pressure or flow rate of the drilling fluid compositions, and any sensors (i.e., pressure, temperature, flow rate, etc.), gauges, and/or combinations thereof, and the like. The disclosed drilling fluid compositions may also directly or indirectly affect the mixing hopper 134 and the retention pit 132 and their assorted variations.

The disclosed drilling compositions may also directly or indirectly affect the various downhole equipment and tools that may come into contact with the drilling compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling compositions may also directly or indirectly affect any downhole heat exchangers, valves and corresponding actuation devices, tool seals, packers and other wellbore isolation devices or components, and the like associated with the wellbore 116. The disclosed drilling compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed drilling compositions may also directly or indirectly affect any transport or delivery equipment used to convey the drilling compositions to the drilling assembly 100 such as, for example, any transport vessels, conduits, pipelines, trucks, tubulars, and/or pipes used to fluidically move the drilling compositions from one location to another, any pumps, compressors, or motors used to drive the drilling compositions into motion, any valves or related joints used to regulate the pressure or flow rate of the drilling compositions, and any sensors (i.e., pressure and temperature), gauges, and/or combinations thereof, and the like.

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLES

Fluid Preparation

Three different invert emulsion fluids ("IEF") (IEF 1-IEF 3) were formulated with commercially available additives, including invert emulsifiers, high-pressure high temperature (HPHT) polymeric filtration control agents, polymeric viscosifiers, lime (emulsifier activator), $CaCl_2$ brine, barite, and a base oil composed predominately of normal alkanes. In a typical experiment, the fluids were first mixed in stainless steel mixing cups using a five spindle multimixer model (Model #9B5) with a rotational speed of 11500 RPM with sine-wave impeller blades No. 9B29X. The fluids were then aged in HPHT stainless steel ageing cells and hot rolled in a Model 705ES Five Roller Oven at 250° F. for 16 hours.

The rheology of the fluids was then determined at 120° F. on a 12-speed standard oilfield rheometer. The temperature was controlled with an electrically heated thermo cup. The testing was performed as per API 13B-2 recommendations. The HPHT fluid loss testing was performed as per API 13B-2 recommendations on an HPHT filter press.

After the fluid is hot rolled for 16 hours followed by determination of the rheological parameters, the fluid is then subjected to static ageing in a static ageing oven at 250° F. for a further 16 hours. In static ageing, the fluid is placed in an upright position under static conditions in a stainless steel ageing cells for 16 hours. The cells are opened, then a syringe is used to remove the separated base oil and measured. The separated base oil is then reported as volume of oil separated. The lower the base oil separated the better is the emulsion stability, volume of base oil less than 3% of the total volume of the fluid is preferred. After the oil separated determination, the syringe is used to remove the top layers of the fluid carefully till the bottom 120 ml of the fluid is left in the ageing cells. The remaining 120 ml of the fluid in the bottom of the cell is mixed with the spatula uniformly and then taken in a density measurement cell of the mud balance to determine its density The closer is the density of the bottom most part to the actual density of the fluid, the better is the suspension of the fluid and lower is the incidence of SAG.

The 12 ppg IEFs with 70/30 oil water ratio (OWR) and a water phase salinity (WPS) of 250,000 ppm CaCl2 solution were prepared with the compositions as noted in the Table 1. The fluids were hot rolled at 250° F., and the HTHP fluid loss was measured at 250° F. The testing was performed as per API 13B-2 and the results are shown in Table 2.

TABLE 1

Composition of 12 ppg IEFs

| | Mixing Time, min | 12 ppg IEF's 70:30 OWR | | |
|---|---|---|---|---|
| | | IEF 1 | IEF 2 | IEF 3 |
| EDC 99 DW, ppb | | 146.7 | 154 | 146 |
| EZ MUL NT, ppb | 2 | 8.00 | 8.00 | 8.00 |
| LIME, ppb | 2 | 1.50 | 1.50 | 1.50 |
| RHEMOD L, ppb | 2 | 3.00 | 3.00 | 3.00 |
| ADAPTA, ppb | 2 | 2.00 | 2.00 | 2.00 |
| CaCl$_2$, ppb | 5 | 30.00 | 30.00 | 30.00 |
| Water, ppb | 5 | 86.70 | 86.00 | 86.00 |
| N VIS HI PLUS, ppb | 5 | 15.00 | 0 | 15.00 |
| AQUAGEL GOLD SEAL, ppb | 5 | 0 | 5.00 | 5.00 |
| BAROID, ppb | 10 | 210.90 | 216.00 | 207.00 |

The results of the tests of the IEFs are shown in Table 2. For the rheological analysis, the PV, YP, and LSYP of the invert emulsion drilling fluid were determined using a direct-indicating FANN 35SA rheometer, powered by an electric motor. The YP is obtained from the Bingham-Plastic rheological model when extrapolated to a shear rate of zero. The PV represents the viscosity of a fluid when extrapolated to infinite shear rate. Both PV and YP are calculated using 300 revolutions per minute (rpm) and 600-rpm shear rate readings on a standard oilfield rheometer as given in Equations 2 and 3. A high YP and low PV is preferred, experimental studies have shown that a high YP in the range of 15-25 and a low PV leading to a ratio of YP/PV greater than 1 contributes to efficient cuttings carrying capacity through the annulus or in simple terms, efficient hole cleaning. The yield stress or $\tau_0$ is the stress that must be applied to a material to make it begin to flow (or yield), and is calculated from rheometer readings measured at rates of 3, 6, 100, 200, 300 and 600 rpm. It is identical to the American Petroleum Institute (API) yield point (YP). The extrapolation in this case may be performed by applying a curve fit to the Herschel-Bulkley rheological model.

$$\tau=\tau_0+k\gamma^n \qquad \text{Eq. 1}$$

The $\tau_0$ can be estimated reasonably by calculating the LSYP value from the 6 rpm and 3 rpm readings using Equation 4.

$$PV\ (600\ \text{rpm reading})-(300\ \text{rpm reading}) \qquad \text{Eq. 2}$$

$$YP=(300\ \text{rpm reading})-PV \qquad \text{Eq. 3}$$

$$LSYP=[2\times(3\ \text{rpm reading})]-(6\ \text{rpm reading}) \qquad \text{Eq. 4}$$

A drilling fluid's $\tau_0$ is used to evaluate carrying capacity and suspension abilities.

TABLE 2

Performance of 12 ppg IEFs

| | Hot Rolled at 250° F., 16 hrs Rheology @ 120° F. | | | | | |
|---|---|---|---|---|---|---|
| | IEF 1 | | IEF 2 | | IEF 3 | |
| | | Static aging 16 hours | | Static aging 16 hours | | Static aging 16 hours |
| 600 rpm | 46 | 46 | 58 | 59 | 92 | 80 |
| 300 rpm | 25 | 25 | 34 | 35 | 59 | 50 |
| 200 rpm | 17 | 17 | 27 | 27 | 45 | 39 |
| 100 rpm | 10 | 10 | 18 | 17 | 30 | 26 |
| 6 rpm | 3 | 3 | 5 | 5 | 10 | 9 |
| 3 rpm | 2 | 2 | 4 | 4 | 9 | 8 |
| PV | 21 | 21 | 24 | 24 | 33 | 30 |
| YP, lb/100 ft$^2$ | 4 | 4 | 10 | 11 | 26 | 20 |
| LSYP | 1 | 1 | 3 | 3 | 8 | 7 |
| 10 sec gel | 2 | 2 | 6 | 6 | 10 | 10 |
| 10 Min gel | 2 | 2 | 10 | 10 | 17 | 17 |
| HTHP, ml/30 min (250° F.) | <1 ml | | <1 ml | | <1 ml | |
| Oil separation, ml | | 100.0 | | 20.0 | | 4.0 |
| Bottom mud weight, ppg | | Barite bed | | 12.6 | | 12.3 |

IEF 1 was prepared using 15 ppb NVIS HI PLUS, YP and LSYP obtained were 4 and 1 respectively. The oil separation observed after static aging the fluid for 16 hours was 100 ml. Heavy sag was observed at the bottom of the aging cell.

IEF 2 was prepared using 5 ppb AQUAGEL GOLD SEAL (Bentonite). The % increase in YP and LSYP when compared to IEF 1 was 150% and 200% respectively. The oil separation observed after static aging the fluid for 16 hours was 20 ml. The density (mud weight) of the bottom part of the fluid was 0.6 ppg higher than the density of the fluid.

IEF 3 is the invention formulation which was prepared with a combination of N VIS HI PLUS and AQUAGEL GOLD SEAL. The % increase in YP and LSYP was 550% and 700% respectively. When static ages, this fluid provided minimal oil separation which is just 1% of the total fluid volume and better suspension properties as compared to IEFs 1 and 2, since the bottom density of IEF 3 is only 0.3 ppg higher than the actual density of the IEF 3.

In case of all the fluids, the HTHP fluid loss obtained was minimal, less than 1 ml.

EDC 99 DW™ is a paraffin/mineral base oil with approximately 99% normal alkanes and about 1% branched alkanes, available from Total, Paris, France. EZ MUL NT™ is an invert emulsifier, available from Halliburton Energy Services, Inc., Houston, Tex. RHEMOD L™ is a polymeric viscosifier, available from Halliburton Energy Services, Inc., Houston, Tex. ADAPTA™ is an HPHT filtration control agent, available from Halliburton Energy Services, Inc., Houston, Tex. AQUAGEL GOLD SEAL™ is a premium, high-yielding Wyoming sodium bentonite, available from Halliburton Energy Services, Inc., Houston, Tex. BAROID™ weighting material is a specially processed barite in powder, available from Halliburton Energy Services, Inc., Houston, Tex.

As seen in the examples above, the invert emulsion fluids of the present invention have improved rheological and separation properties. The resulting clay-free invert emulsion fluids have increases in YP and LSYP, minimal oil separation when static aged, and improved suspension properties over fluids without mixed metal hydroxide-bentonite interactions.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Embodiments disclosed herein include:

A: A method of drilling in a subterranean formation comprising: providing or using an invert emulsion drilling fluid including: an oleaginous continuous phase, a nonoleaginous discontinuous phase; mixed metal layered hydroxides comprising hydroxide ions associated with at least two metal cations, wherein one is a divalent cation and another is a trivalent cation, and bentonite, wherein the drilling fluid is substantially free of organophilic clays, and drilling the subterranean formation with the drilling fluid.

B: An invert emulsion drilling fluid for drilling in a subterranean formation comprising: an oleaginous continuous phase, a nonoleaginous discontinuous phase, mixed metal layered hydroxides comprising hydroxide ions associated with at least two metal cations, wherein one is a divalent cation and another is a trivalent cation, and bentonite, wherein the drilling fluid is substantially free of organophilic clays.

C: A method of drilling in a subterranean formation comprising: providing or using an invert emulsion drilling fluid including: an oleaginous continuous phase, an internal phase comprising water, sodium bentonite, and mixed metal layered hydroxides comprising aluminum and magnesium, wherein the drilling fluid is substantially free of organophilic clays, and drilling the subterranean formation with the drilling fluid.

Each of embodiments A, B and C may have one or more of the following additional elements in any combination: Element 1: wherein oleaginous continuous phase of the drilling fluid comprises at least one base oil selected from the group of oils consisting of synthetic oils comprising an ester or olefin, diesel oils, mineral oils selected from the group consisting of n-paraffins, isoparaffins, cyclic alkanes, branched alkanes, and mixtures thereof. Element 2: wherein the mixed metal layered hydroxides comprise at least two metal cations, wherein one is a divalent cation selected from the group consisting of Mg Ca, Ba, Sr, Mn, Fe, Co, Ni, Cu and Zn, and wherein another is a trivalent cation selected from the group consisting of Al, Ga, Cr and Fe. Element 3: wherein the mixed metal layered hydroxides are present in the amount of about 2 ppb to about 20 ppb. Element 4: wherein the bentonite is present in the amount of about 1 ppb to about 15 ppb. Element 5: wherein the percent increase in the yield point (YP) for the fluid with bentonite and the mixed metal layered hydroxides as compared to the fluid without bentonite or without mixed metal layered hydroxides, is greater than 150%. Element 6: wherein the percent increase in YP is greater than about 200%. Element 7: wherein the percent increase in the low shear yield point (LSYP) for the fluid with bentonite and the mixed metal layered hydroxides as compared to the fluid without bentonite or without the mixed metal layered hydroxides, is greater than 200%. Element 8: wherein the percent increase in LSYP is greater than about 300%. Element 9: wherein the drilling fluid includes at least one additive from the group consisting of weighting agents, inert solids, fluid loss control agents, emulsifiers, salts, dispersion aids, corrosion inhibitors, emulsion thinners, emulsion thickeners, viscosifiers, HPHT emulsifier filtration control agents, and any combination thereof. Element 10: wherein the bentonite is an externally added sodium bentonite from the formation. Element 11: wherein a portion of the bentonite that is in the drilling fluid is externally sourced from the formation. Element 12: wherein the bentonite is sodium bentonite.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of drilling in a subterranean formation comprising:
    providing or using a clay-free invert emulsion drilling fluid consisting essentially of:
        an oleaginous continuous phase comprising at least one base oil;
        a nonoleaginous discontinuous phase;
        mixed metal layered hydroxides comprising hydroxide ions associated with at least two metal cations, wherein one of the at least two metal cations is a divalent cation and another of the at least two metal cations is a trivalent cation; and
        bentonite, wherein the drilling fluid is substantially free of organophilic clays, and wherein a percent increase in the yield point (YP) for the invert emulsion drilling fluid with bentonite and the mixed metal layered hydroxides as compared to the same fluid without the bentonite or without the mixed metal layered hydroxides, is greater than 150%; and
    drilling the subterranean formation with the drilling fluid.

2. The method of claim 1, wherein the at least one base oil is selected from the group of oils consisting of synthetic oils comprising an ester or olefin; diesel oils; mineral oils selected from the group consisting of n-paraffins, isoparaffins, cyclic alkanes, branched alkanes, and mixtures thereof.

3. The method of claim 1, wherein the divalent cation is selected from the group consisting of Mg, Ca, Ba, Sr, Mn, Fe, Co, Ni, Cu and Zn, and wherein the trivalent cation is selected from the group consisting of Al, Ga, Cr and Fe.

4. The method of claim 1, wherein the mixed metal layered hydroxides are present in the amount of about 2 pounds per barrel (ppb) to about 20 pounds per barrel (ppb).

5. The method of claim 1, wherein the bentonite is present in the amount of about 1 pound per barrel (ppb) to about 15 pounds per barrel (ppb).

6. The method of claim 1, wherein the percent increase in YP is greater than about 200%.

7. The method of claim 1, wherein a percent increase in the low shear yield point (LSYP) for the invert emulsion drilling fluid with bentonite and the mixed metal layered hydroxides as compared to the same fluid without the bentonite or without the mixed metal layered hydroxides, is greater than 200%.

8. The method of claim 7, wherein the percent increase in LSYP is greater than about 300%.

9. The method of claim 1, wherein the drilling fluid includes at least one additive from the group consisting of weighting agents, inert solids, fluid loss control agents, emulsifiers, salts, dispersion aids, corrosion inhibitors, emulsion thinners, emulsion thickeners, viscosifiers, high-pressure high temperature (HPHT) emulsifier filtration control agents, and any combination thereof.

10. The method of claim 1, wherein the bentonite is an externally added sodium bentonite from the formation.

11. A clay-free invert emulsion drilling fluid for drilling in a subterranean formation, the drilling fluid consisting essentially of:
    an oleaginous continuous phase comprising at least one base oil;
    a nonoleaginous discontinuous phase;
    mixed metal layered hydroxides comprising hydroxide ions associated with at least two metal cations, wherein one of the at least two metal cations is a divalent cation and another of the at least two metal cations is a trivalent cation; and
    bentonite, wherein the drilling fluid is substantially free of organophilic clays,
    wherein a percent increase in the yield point (YP) for the invert emulsion drilling fluid with bentonite and the mixed metal layered hydroxides as compared to the same fluid without the bentonite or without the mixed metal layered hydroxides, is greater than 150%.

12. The drilling fluid of claim 11, wherein the at least one base oil is selected from the group of oils selected from the group consisting of synthetic oils comprising an ester or olefin; diesel oils; mineral oils selected from the group consisting of n-paraffins, isoparaffins, cyclic alkanes, branched alkanes, and mixtures thereof.

13. The drilling fluid of claim 11, wherein the divalent cation is selected from the group consisting of Mg, Ca, Ba, Sr, Mn, Fe, Co, Ni, Cu and Zn, and wherein the trivalent cation is selected from the group consisting of Al, Ga, Cr and Fe.

14. The drilling fluid of claim 11, wherein the mixed metal layered hydroxides are present in the amount of about 2 pounds per barrel (ppb) to about 20 pounds per barrel (ppb).

15. The drilling fluid of claim 11, wherein the bentonite is present in the amount of about 1 pound per barrel (ppb) to about 15 pounds per barrel (ppb).

16. The drilling fluid of claim 11, wherein the percent increase in YP is greater than about 200%.

17. The drilling fluid of claim 11, wherein a percent increase in the low shear yield point (LSYP) for the invert emulsion drilling fluid with bentonite and the mixed metal layered hydroxides as compared to the same fluid without the bentonite or without the mixed metal layered hydroxides, is greater than 200%.

18. The drilling fluid of claim 17, wherein the percent increase in LSYP is greater than about 300%.

19. A method of drilling in a subterranean formation comprising:
    providing or using a clay-free invert emulsion drilling fluid consisting essentially of:
        an oleaginous continuous phase comprising at least one base oil;
        an internal phase comprising water;
        sodium bentonite; and
        mixed metal layered hydroxides comprising aluminum and magnesium, wherein the drilling fluid is substantially free of organophilic clays,
        wherein a percent increase in the yield point (YP) for the invert emulsion drilling fluid with bentonite and the mixed metal layered hydroxides as compared to the same fluid without the bentonite or without the mixed metal layered hydroxides, is great than 150%, and
    drilling the subterranean formation in the presence of the drilling fluid.

* * * * *